(No Model.)

L. J. WIDMER.
STUMP PULLER.

No. 557,630.　　　　　　　　　　Patented Apr. 7, 1896.

Witnesses
E. H. Monroe
V. B. Hillyard

Inventor
Louis J. Widmer
By his Attorneys,
C. A. Snow & Co.

UNITED STATES PATENT OFFICE.

LOUIS J. WIDMER, OF WACO, TEXAS.

STUMP-PULLER.

SPECIFICATION forming part of Letters Patent No. 557,630, dated April 7, 1896.

Application filed July 13, 1895. Serial No. 555,907. (No model.)

*To all whom it may concern:*

Be it known that I, LOUIS J. WIDMER, a citizen of the United States, residing at Waco, in the county of McLennan and State of Texas, have invented a new and useful Stump-Puller, of which the following is a specification.

This invention relates to grubbing and stump-pulling machinery.

The objects in view are to provide a structure which can be quickly assembled and taken apart, to devise a device which will admit of the rope being quickly paid off from the capstan after the stump has been uprooted, and, finally, to provide a machine which can be easily handled and which will perform the required work in a rapid and satisfactory manner and which can be transported from one stump to the other by being dragged upon the ground.

Other objects and advantages will become manifest as the nature of the invention is unfolded in the following description, reference being had to the accompanying drawings, in which—

Figure 1:
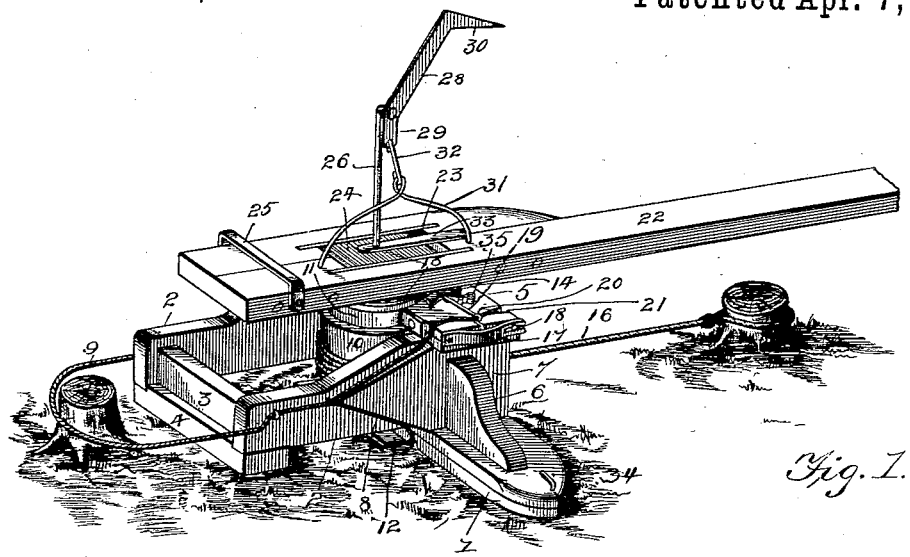
Figure 2:
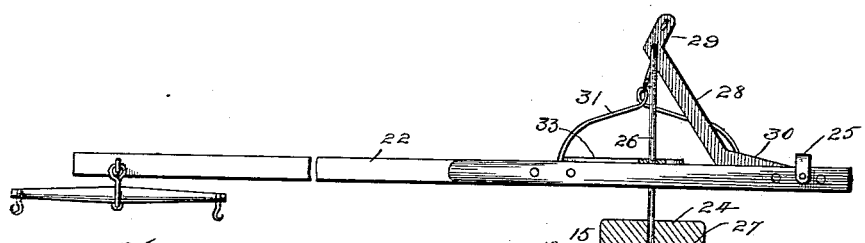
Figure 3:
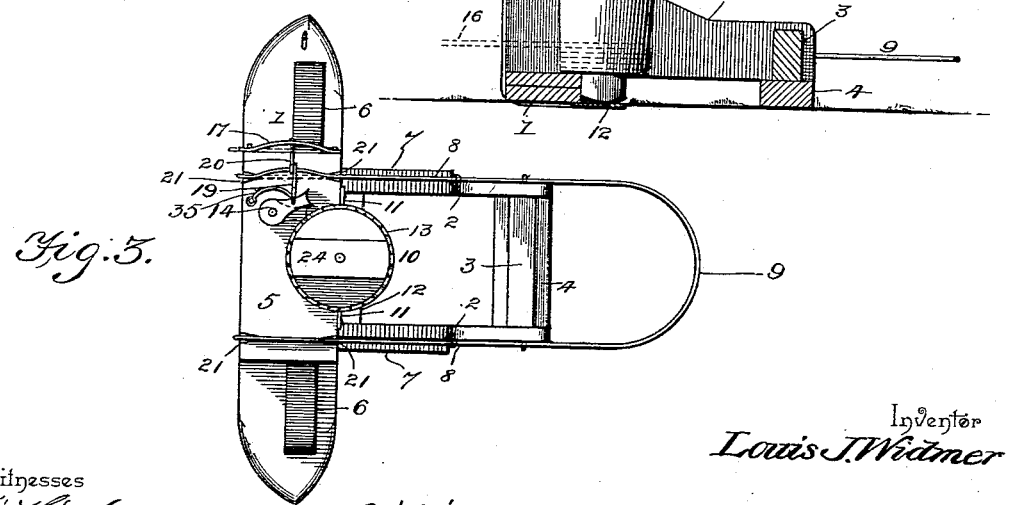

Figure 1 is a perspective view showing the application of the invention. Fig. 2 is a vertical section, parts being broken away, showing the sweep elevated. Fig. 3 is a top plan view, the sweep being detached, showing the manner of operating the detent.

The framework comprises a base-beam 1, side bars 2, end bars 3 and 4, and an upper bar 5 parallel with and directly above the base-beam 1. The side bars 2 extend in parallel relation and are fitted at their front ends in grooves formed in the opposing sides of the base-beam 1 and the upper bar 5, and are strengthened and braced at their rear ends by the horizontal bar 4 and the vertical bar 3. The ends of the base-beam 1 project beyond the sides of the bars 2, and the projecting portions support brackets 6, which bear laterally against the side bars 2 and brace and strengthen the structure. The outer sides of the side bars 2 have projecting portions 7 whose rear edges converge and form bearing-surfaces for the running nooses 8 of the anchoring-rope 9, said nooses extending around the end portions of the base-beam 1 and the upper bar 5 and entering notches therein so as to prevent the accidental slipping of the said nooses when the parts are operatively related. These nooses 8 serve to retain the parts 1, 2, and 5 in working position, and when removed admit of the framework being readily reduced to a compact form. The bight or loop of the anchoring-rope extending in the rear of the framework is adapted to be engaged with a stump, so as to fix the position of the machine when it is required to extract or uproot a stump. This anchoring-rope may be of hemp or jute, but is preferably a wire cable, as the latter is possessed of a certain amount of rigidity not to be obtained by the use of hemp, jute, or Manila rope.

The capstan 10, which is preferably formed of some hard wood, is mounted in bearings formed in the inner edges of the base-beam 1 and the upper bar 5, and is retained in place against accidental displacement by means of a strap 11, secured at its ends to the inner edge of the bar 5 and fitting in an annular seat formed near the upper end of the capstan 10. The lower reduced end or journal of the capstan is pointed or convexed at its extremity and is mounted upon a metal plate 12, secured to the under side of the base-beam 1, and by convexing the lower end of the capstan the frictional surface thereof with the metal plate 12 is reduced and the said capstan rendered easy to rotate.

An annular ratchet 13 is provided at the upper end of the capstan and is formed by shrinking or fitting a section of sprocket-chain thereon. To prevent splitting of the capstan and obviate wear thereof by receiving the end-thrust of the detent 14, a metal band 15 is secured upon the capstan opposite the ratchet 13 and between the said ratchet and the side of the capstan. The sprocket-chain forming the ratchet may be attached in any convenient manner to the metal band 15 or to the capstan itself, as found most desirable.

The detent 14 is pivotally secured to the upper bar 5, and its free end is adapted to engage with the ratchet-teeth 13 and prevent the capstan from turning backward when the rope 16 is under tension. A bow-spring 17 is fastened at one end to the extremity of the bar 5, and its opposite end is slotted, as shown at 18, and engages with a headed fastening, and a rod or stout wire 19 connects the detent 14 with the said bow-spring, and the parts are so proportioned that when the rope 16 is not subjected to tension the bow-spring 17 will hold the detent 14 out of engagement with the ratchet-teeth 13. The rod or wire 19 is formed between its ends with an eye 20, which is a turn or coil of the said wire, and through this eye 20 passes the upper portion of the anchoring-rope 9. When the anchoring-rope 9 is subjected to tension, it will exert a pressure or pull upon the wire or rod 19 in opposition to the bow-spring 17 and force the detent 14 in engagement with the ratchet-teeth 13. Hence when the machine is in efficient service the detent is in working position and prevents the capstan from turning back. That portion of the anchoring-rope passing over the upper bar 5 is held from displacement by any suitable means, preferably by entering notches 21 in the opposite corners of the said bar 5, and the eye 20 is to one side of a straight line passing through the said notches. Obviously when the anchoring-rope is subjected to tension it will straighten between the notches 21 and move the detent into engagement with the ratchet-teeth. This will take place when the anchoring-rope and extracting-rope 16 are subjected to tension. The instant the stump is uprooted the tension upon the ropes 9 and 16 will be relieved and the bow-spring 17 regaining itself will automatically withdraw the detent 14 from engagement with the ratchet-teeth 13 and permit the rope 16 to be withdrawn from off the capstan.

The sweep 22 has a mortise 23 near its inner end to receive the angular end 24 of the capstan, and the sides of this mortise are reinforced by metal plates so as to allow for wear and prevent the corners of the said end 24 from cutting into the walls of the mortise 23. A bail 25 is located near the inner end of the sweep and is intended to receive a board or other device which may be slipped thereunder so as to counterbalance the sweep and steady it upon the capstan. A post 26 is let into the upper end of the capstan and is pointed at its lower end and obtains a bearing upon a metal step 27 at the inner end of the vertical bore into which the lower end of the said post is thrust. A lever 28 is mounted upon a lateral extension at the upper end of the post 26, and its short arm 29 is bent to one side, and the extremity of the long arm terminates in a foot 30 which obtains an extended bearing upon the top side of the sweep and retains the lever in position when the sweep is elevated.

A bail 31 extends over the mortise 23 and has its extremities fastened to the sweep upon opposite sides of the said mortise, and a link 32 connects the bail 31 with the short arm 29 of the lever. A bar 33 is fastened to the sweep at one end of the mortise and extends over the latter, and is vertically apertured to receive the post 26, and is intended to prevent the sweep from swaying movements when suspended and disengaged from the capstan.

By having the short arm 29 of the lever 28 bent or deflected the weight of the sweep is brought to one side of the pivotal connection of the lever with the said post, which side corresponds with the position of the foot 30 when the sweep is suspended, thereby holding the said foot 30 in positive engagement with the sweep and forming a lock-joint with the latter, as shown most clearly in Fig. 2. When it is required to move the machine from one place to another, the draft is applied to the hook 34 at one end of the base-beam 1.

When it is required to extract a stump, the loop of the anchoring-rope is slipped over a stump or other convenient point of anchorage and the extracting-rope 16 is hitched to the stump to be drawn in any convenient manner, and the said rope 16 being fastened to the capstan is wound thereon by rotating the sweep 22 in the usual manner. As soon as the anchoring-rope and the extracting-rope are subjected to tension the detent 14 will be caused to engage with the ratchet-teeth 13 and the draft will be relieved from undue strain and the animal can rest without having to bear the load, the same being sustained by the detent and the ratchet-teeth. The instant the stump is withdrawn the ropes slacken and the detent automatically releases the capstan, as previously set forth.

The framework, if preferred, can be made of a single block properly hewed; but the construction shown is preferred, and it is to be understood that various changes in the form, proportion, and the minor details of construction may be resorted to without departing from the principle or sacrificing any of the advantages of this invention.

In the event of the detent 14 being disconnected from the rod 19, and in order that the said detent may be held in working position so as to engage with the ratchet-teeth 13, it has been found expedient to provide a spring and dispose the same, so as to exert a pressure upon the detent 14 and hold it in engagement with the said ratchet-teeth. This spring 35 is shown most clearly in Fig. 3 and is secured at one end to the upper bar 5, and its free end bears laterally against the outer edge of the detent 14. It will be understood that when the spring 17 is operatively connected by means of the rod 19 with the said detent 14, the said spring 35 will be thrown out of engagement with the said detent 14, said spring 35 being used only in the manner set forth when the rod 19 is disconnected from the detent 14.

Having thus described the invention, what is claimed as new is—

1. In a stump-puller, the combination with a base-beam, parallel side bars, and an upper bar, of an anchoring-rope having running nooses at its ends, and which nooses encircle the end portions of the base-beam and upper bar and grip them upon the intermediate side bars, substantially as set forth for the purpose described.

2. In a stump-puller, the combination with the capstan having ratchet-teeth, and a detent to engage with the said ratchet-teeth, of a spring operatively connected with the detent to normally hold the latter from engagement with the ratchet-teeth, and a rope operatively connected with the detent and disposed to overcome the force of the spring provided to hold the detent out of working engagement and force the said detent into engagement with the ratchet-teeth when the said rope is subjected to tension, substantially as set forth.

3. In a stump-puller, the combination with the capstan having ratchet-teeth, and a detent, of a bow-shaped spring, a rod operatively connecting the bow-spring with the detent and having an eye, and a draft-rope passing through the said eye and adapted to overcome the pressure of the said bow-spring when subjected to tension so as to force the detent into engagement with the ratchet-teeth, substantially as specified.

4. In a stump-puller, the combination with the capstan, and a sweep, of a post mounted in the upper end of the capstan, a lever fulcrumed upon the post and having a foot at the end of its long arm to obtain an extended bearing upon the sweep to automatically retain the latter in an elevated position, and connections between the sweep and the short arm of the lever and exerting and applying the force at a point between the foot of the lever and its fulcrum, whereby the said foot will be held against the sweep when the latter is raised, substantially as set forth.

5. In a stump-puller, the combination with the capstan and the sweep, of a post mounted in the upper end of the capstan, a lever fulcrumed upon the post and connected with the sweep, and a bar secured to the sweep and extending over the mortise therein, and apertured for the passage of the said post, substantially as described for the purpose set forth.

6. The herein-described stump-puller, comprising similar side bars having projecting portions on their outer sides whose edges converge, a base-beam having brackets to bear laterally against the side bars, an upper bar parallel with the base-beam, an anchoring-rope having running nooses at its ends which encircle the end portions of the base-beam and upper bar and are fitted against the converging edges of the projecting portions of the said side bars, a capstan having an angular end portion and journaled in bearings formed in the inner edges of the base-beam and upper bar, a detent for engaging ratchet-teeth of the capstan and normally held out of working position and controlled by the said anchoring-rope, and forced into engagement with the ratchet-teeth when the said anchoring-rope is subjected to tension, a post mounted in the upper end of the capstan, a lever fulcrumed upon the post and operatively connected with the sweep, and having a foot, a sweep having a mortise to receive the angular end of the capstan, and a bar connected with the sweep to one side of the mortise and apertured for the passage of the said post, substantially as described for the purpose set forth.

In testimony that I claim the foregoing as my own I have hereto affixed my signature in the presence of two witnesses.

LOUIS J. WIDMER.

Witnesses:
J. P. J. KNIGHT,
G. M. SCARBOROUGH.